United States Patent
Al-Dweik et al.

(10) Patent No.: US 9,509,538 B1
(45) Date of Patent: Nov. 29, 2016

(54) DIGITAL COMMUNICATION RECEIVER USING PARTIAL KNOWLEDGE OF THE CHANNEL STATE INFORMATION

(71) Applicant: Khalifa Univ. of Sci., Tech. & Research (KUSTAR), Abu Dhabi (AE)

(72) Inventors: Arafat Jamil Al-Dweik, Abu Dhabi (AE); Youssef Iraqi, Abu Dhabi (AE); Mohammed Al-Mualla, Abu Dhabi (AE)

(73) Assignee: KHALIFA UNIVERSITY OF SCIENCE, TECHNOLOGY & RESEARCH (KUSTAR), Abu Dhabi (AE)

( * ) Notice: Subject to any disclaimer, the term of this patent is extended or adjusted under 35 U.S.C. 154(b) by 0 days.

(21) Appl. No.: 14/816,576

(22) Filed: Aug. 3, 2015

(51) Int. Cl.
- *H03D 1/24* (2006.01)
- *H04L 27/06* (2006.01)
- *H04B 1/10* (2006.01)

(52) U.S. Cl.
CPC .............. *H04L 27/06* (2013.01); *H04B 1/10* (2013.01)

(58) Field of Classification Search
CPC ... H04L 27/06; H04L 27/38; H04L 27/3809; H04L 27/3827; H04L 27/2647; H04L 1/20; G11C 7/10; H04N 5/4401; H04B 1/30; H04B 1/28
USPC .......................... 375/320, 319, 316, 219, 295
See application file for complete search history.

(56) References Cited

U.S. PATENT DOCUMENTS

| | | | | |
|---|---|---|---|---|
| 2004/0242179 A1* | 12/2004 | Onggosanusi | ..... | H04B 1/71055 455/296 |
| 2010/0040171 A1* | 2/2010 | Qu | ........................ | H04L 1/0003 375/298 |
| 2012/0093208 A1* | 4/2012 | Wu | ....................... | H04L 1/0036 375/224 |

OTHER PUBLICATIONS

Al-Dweik, A. et al.: "Frequency-Hopped Multiple-Access Communications with noncoherent M-ary OFDM-ASK." Communications, IEEE Transactions, vol. 51, No. 1 pp. 33-36, Jan. 2003.

Divsalar, D. et al.: "Multiple-Symbol Differential Detection of MPSK." IEEE Transactions on Communications, vol. 38, No. 3, pp. 300-308, Mar. 1990.

Ozdemir, O. et al.: "Exact Average OFDM Subcarrier SINR Analysis Under Joint Transmit—Receive I/Q Imbalance", IEEE Transactions on Vehicular Technology, vol. 63, No. 8, pp. 4125-4130, Oct. 2014.

Malliik R.K et al.: "Noncoherent Reception of Multi-Level ASK in Rayleigh Fading with Receive Diversity" IEEE Transactions on Communications, vol. 62, No. 1, pp. 135-143, Jan. 2014.

(Continued)

Primary Examiner — Zewdu Kassa
(74) Attorney, Agent, or Firm — Buchanan, Ingersoll & Rooney PC

(57) ABSTRACT

The present invention proposes a demodulator device, a receiver and a demodulation method for M-ary amplitude shift keying systems (MASK) that requires partial knowledge of the CSI, namely, the channel attenuation coefficient. Therefore, the new demodulator, receiver and demodulation method do not require the knowledge of the channel phase shift. Consequently, no complicated channel estimation techniques are required, and the system will be very robust to the system impairments such as phase noise, I-Q imbalance, etc. In this sense, the new technique is denoted as semi-coherent demodulation (SCD). To reduce the complexity of the new SCD, a suboptimal demodulator is derived which has much lower complexity than the optimal while providing almost the same error probability.

18 Claims, 9 Drawing Sheets

(56) References Cited

OTHER PUBLICATIONS

Simon, M.: "Digital Communication Over Fading Channels—A Unified Approach to Performance Analysis" 1$^{st}$ Edition, vol. 95, John Wiley & Sons, 2005.

ETSI: "Radio Broadcasting Systems; Digital Audio Broadcasting (DAB) to mobile, portable and fixed receivers", EN 300 401, European Telecommunications Standards Institute, Apr. 2000.

ETSI: "Digital Video Broadcasting (DVB); Framing structure, channel coding and modulation for digital terrestrial television", Standard EN 300 744, European Telecommunications Standards Institute, Valbonne, France, 1997.

ETSI TS 136 300 V10.4.0 (Jun. 2011) LTE; Evolved Universal Terrestrial Radio Access (E-UTRA) and Evolved Universal Terrestrial Radio Access Network (EUTRAN); Overall description; Stage 2 (3GPP TS 36.300 version 10.4.0 Release 10).

Part 11: Wireless LAN Medium Access Control (MAC) and Physical Layer (PHY) Specifications, Amendment 6: Wireless Access in Vehicular Environments, IEEE 802.11, pp. 1-51 Jul. 15, 2010.

Krishnan, R. et al.: "Constellation optimization in the presence of strong phase noise." Communications, IEEE Transactions vol. 61, No. 12, pp. 5056-5066, 2013.

Maymon, S. et al.: "Sinc Interpolation of Nonuniform Samples" Signal Processing, IEEE Transactions vol. 59, No. 10, pp. 4745-4758, 2011.

Jakes, W. C.et al.: "Microwave Mobile Communications" Wiley-IEEE Press, 1994.

IEEE 1901, IEEE Standard for Broadband over Power Line Networks: Medium Access Control and Physical Layer Specifications. Tech. Report, 2010.

IEEE 802.16, IEEE Standard for Local and Metropolitan Area Networks. Part 16: Air Interface for Fixed Broadband Wireless Access Systems. IEEE Std 802 pp. 16-2004, 2004.

\* cited by examiner

DIGITAL COMMUNICATION RECEIVER USING PARTIAL KNOWLEDGE OF THE CHANNEL STATE INFORMATION

FIELD OF THE INVENTION

The present invention generally relates to the field of digital communications, and more particularly to a communication system, digital receiver, a demodulator and a method of demodulation using partial knowledge of the channel state information.

BACKGROUND OF THE INVENTION

In the literature, there are three types of demodulation techniques that are currently used in various wired and wireless communications techniques [1], namely, coherent, non-coherent and differentially coherent, which are denoted as CD, NCD and DCD, respectively. Each of the mentioned demodulation techniques is used for particular applications based on the channel and system resources and requirements. Moreover, selecting a particular modulation/demodulation method enables to trade-off the error performance, complexity and spectral efficiency. For example, CD provides low error probability given that the channel state information (CSI) is known accurately at the receiver side. However, accurate knowledge of the CSI requires invoking channel estimation techniques, which might require high complexity signal processing techniques and might affect the system spectral efficiency as well. On the contrary, NCD does not require any information about the CSI hence its a low complexity demodulator, however the error probability is generally very high [2]. DCD is different from CD and NCD because it requires the transmitter to introduce memory in the transmitted sequence. The information symbols extraction does not require the knowledge of the CSI at the received side, however, it requires the CSI to be almost fixed over two consecutive symbols. The probability of error and complexity for the DCD is generally in between CD and NCD. The main disadvantage of DCD is that it requires differential encoding at the transmitter side, and the receiver should know the phase of the first symbol in the received sequence [3], hence it requires some sort of pilot symbols which degrades the spectral efficiency. Moreover, it is very sensitive to phase noise and I-Q imbalance impairments [4]. Therefore, DCD is not suitable for applications where the received signal suffers from phase noise, large phase variations, or time-varying I-Q imbalance.

SUMMARY OF THE INVENTION

Brief Explanation

The present invention presents a new class of demodulation for M-ary amplitude shift keying systems (MASK) that requires partial knowledge of the CSI, namely, the channel attenuation coefficient. Therefore, the new demodulator does not require the knowledge of the channel phase shift. Consequently, no complicated channel estimation techniques are required, and the system will be very robust to the system impairments such as phase noise, I-Q imbalance, etc. In this sense, the new technique is denoted as semi-coherent demodulation (SCD). To reduce the complexity of the new SCD, a suboptimal demodulator is derived which has much lower complexity than the optimal while providing almost the same error probability.

Generally speaking, the CSI is composed of real and imaginary components, which can be expressed as $h=|h| e^{j\theta}$, where $|h|$ corresponds to the channel attenuation and $\theta$ is the phase shift. In the proposed receiver, only $|h|$ is required to detect the transmitted symbols with low probability of error. The proposed receiver can be used to increase the spectral efficiency of most digital communications receiver and/or reduce their error probability.

Main Features:

This patent describes an efficient new digital communications receiver that has never been considered before. The main features of the new receiver are:

Low complexity, because it does not require estimating the phase of the carrier at the receiver side.

Provides much better error performance as compared to the non-coherent receivers.

It is based on a novel demodulation scheme that was never considered by other researchers.

Can be configured to provide high spectral efficiency when higher order modulation is used.

Enables the design engineers to trade off complexity and error performance based on the system requirements.

Very robust to harsh channels with severe phase noise, I-Q imbalance and carrier frequency offsets.

Can be incorporated in coherent systems to provide low complexity blind channel estimation.

Benefits:

Low complexity is an essential requirement for most modern communication systems. Because most state-of-the-art communications systems support mobility, most of the communicating devices will be supported by a limited size and energy batteries. Consequently, saving the processing power can contribute significantly to prolong the battery life.

High spectral efficiency is one of the most critical parameters that determine the network capacity. The demand for additional spectrum has witnessed a substantial surge in the past few years, and it is expected to keep growing due to the emerging broadband applications, and the increasing number of subscribers who require data support on their wireless devices. Therefore, developing spectrally efficient communication systems is indispensable.

Due to the widespread of personal wireless systems, the communications channel has become very hostile as compared to the channels of classical communication systems. Most of the communications sessions currently are being held from indoor buildings or high speed transportation tools such as trains and vehicles. In such environments, performing coherent detection is extremely challenging because accurate channel estimation and synchronization in such environments is infeasible. The proposed system does not require phase estimation or synchronization, and hence it will be very robust in severe channels.

Blind channel estimation is essential for coherent digital communications. The new approach enables low complexity blind channel estimation for coherent systems.

Limitations:

The bit error performance of the proposed technique is not as good as the coherent systems in ideal channel conditions. However such difference becomes very small in practical non-ideal scenarios. Moreover, the performance difference can be substantially reduced when diversity techniques are involved, which makes the system very attractive for various applications.

Aspects of the Invention:

As a first aspect of the invention, there is provided a digital communication receiver for detecting signals transmitted by a digital transmitter through a communication channel, the channel having a channel attenuation |h| and a channel phase shift having a multipath fading effect on the transmitted signals, the receiver comprising a demodulator configured to demodulate signals received by the receiver using channel coefficients representing the channel attenuation only without any knowledge of the channel phase shift.

Preferably, the demodulator is robust to phase noise, large phase variations and time-varying I-Q imbalance.

Preferably, the demodulator uses a M-ary amplitude shift keying technique, the transmitted signals being modulated by the transmitter using said same technique before transmission using a modulation order M equal or superior to 2.

Preferably, the detected signals have a symbol Error Rate (SER) intermediate in terms of performance between a coherent detection and a non-coherent detection assuming a same spectral efficiency.

Preferably, the demodulator is less complex than a coherent demodulator, and wherein the SER performance of the detected signals using the demodulator is substantially similar to a SER performance obtained using a coherent demodulator.

Preferably, the channel is a multi-path fading channel. The multi-path fading channel can be for example Rayliegh, Ricean or Nakagami.

Preferably, the received signals have an energy $\eta$ and the channel attenuation coefficients have a magnitude $|h|^2$, and wherein the demodulator is configured to equalize the energy of the receivd signals $\eta$ using only the magnitude of the channel coefficients $|h|^2$ such that an equalized envelop of the received signals is obtained according to the following equation in which the multipath fading effect of the channel on the transmitted signals is converted into an additive disturbance:

$$\zeta = \frac{\eta}{|h|^2} = \frac{|v|^2}{|h|^2} = |A_i^2| + \frac{1}{|h|^2}[(h^*A_i^*w + hA_iw^*) + |w|^2].$$

where $\zeta$ is: the energy equalized signal
where $v$ is: the received signal
where $A_i^2$ is: the energy of the transmitted symbol
where $w$ is: additive white Gaussian noise
where $(.)^*$ denotes the complex conjugate.

Preferably, the demodulator makes decisions for the detection of transmitted signals according to the following conditional probability distribution function (PDF):

$$P(\zeta|E_i) = \frac{(\Psi_i + \sigma_w^4)\sigma_h^2}{[(\zeta - E_i)^2\sigma_h^4 + 2\Psi_i + \sigma_w^4]^{3/2}}$$

where $\zeta$ is a decision variable and where $\psi_i = (\zeta + E_i)\sigma_w^2\sigma_h^2$.
where $E_i$ is: the energy of the transmitted symbol
where $\sigma_w^2$ is: the noise variance
where $\sigma_h^2$ is: the variance of the fading coefficients Preferably, the demodulator makes decisions for the detection of transmitted signals according to the following minimum distance detector (MDD) equation:

$$\hat{A}_i = \mathrm{argmin}_{E_i}[\zeta - E_i]^2, \ i = [0,1,\ldots,M-1],$$

where $\hat{A}_i$ is: the estimated symbol amplitude
where M is the modulation order.

Preferably, the MDD has a Signal to Error Ratio (SER) which follows the following equation:

$$P_S = 1 - \frac{1}{M} + \frac{1}{M}\left[\sum_{i=1}^{M-1}\lambda_i - \sum_{i=2}^{M}\chi_i\right],$$

where $$\lambda_i \triangleq \frac{1 - \delta^2[i-0.5]\Gamma}{2\sqrt{(\delta^2[i-0.5]\Gamma)^2 + 2\delta^2[2i^2 - 3i + 1.5]\Gamma + 1}}$$

$$\chi_i \triangleq \frac{1 + \delta^2[i-0.5]\Gamma}{2\sqrt{(\delta^2[i-1.5]\Gamma)^2 + 2\delta^2[2i^2 - 5i + 3.5]\Gamma + 1}}$$

where $$\Gamma = \frac{\sigma_H^2}{\sigma_w^2}\overline{E},$$

and $\overline{E} = 1/M\Sigma_{i=0}^{M-1}E_i$ is the average power per symbol which is normalized to unity,
where $P_S$ is: the symbol error probability
where $\chi_i$ is: already defined above
where $\delta$ is: amplitude difference between adjacent symbols
where $\Gamma$ is: average symbol energy Preferably, the attenuation channel coefficients are obtained by inserting pilot symbols within the transmitted signals with a particular time spacing, the pilot symbols having a constant modulus, $|s|^2 = P$, where P is a constant.

Preferably, the estimated value of the channel attenuation magnitude $|h|^2$ is obtained by computing $\hat{\alpha} = \eta_{P/|s|^2}$,
Where $\eta_P = |v_P|^2 = |h|^2|s|^2 + (h^*s^*w + hsw^*) + |w|^2.$ As a further aspect of the invention, there is provided a computer-implemented demodulation method comprising:
receiving from a digital communication receiver signals transmitted by a digital transmitter through a communication channel, the channel having a channel attenuation |h| and a channel phase shift having a multipath fading effect on the transmitted signals; and
demodulating the signals received by the receiver using only channel coefficients representing the channel attenuation without any knowledge of the channel phase shift for detecting the transmitted signals.

Preferably, the demodulation method is robust to phase noise, large phase variations and time-varying I-Q imbalance.

Preferably, the demodulation method uses a M-ary amplitude shift keying technique, the transmitted signals being modulated by the transmitter using said same technique before transmission using a modulation order M equal or superior to 2.

Preferably, the detected signals have a symbol Error Rate (BER) intermediate in terms of performance between a coherent detection and a differentially coherent detection assuming a same spectral efficiency.

Preferably, the demodulation method is less complex than a coherent demodulation, and wherein the SER performance of the detected signals using the demodulation method is substantially similar to a SER performance obtained using a coherent demodulation.

Preferably, the channel is a multi-path fading channel. The multi-path fading channel can be for example Rayliegh, Ricean or Nakagami.

Preferably, the received signals have an energy $\eta$ and the channel attenuation coefficients have a magnitude $|h|^2$, and wherein the demodulation method further comprises equalizing the energy of the received signals $\eta$ using only the manguitude of the channel coefficients $|h|^2$ such that an equalized envelop of the received signals is obtained according to the following equation in which the multipath fading effect of the channel on the transmitted signals is converted into an additive disturbance:

$$\zeta = \frac{\eta}{|h|^2} = \frac{|v|^2}{|h|^2} = |A_i^2| + \frac{1}{|h|^2}[(h^*A_i^*w + hA_iw^*) + |w|^2].$$

where $\zeta$ is: the energy equalized signal
where $v$ is: the received signal
where $A_i^2$ is: the energy of the transmitted symbol
where w is: additive white Gaussian noise
where (.)* denotes the complex conjugate.

Preferably, the demodulation method further comprises making decisions for the detection of transmitted signals according to the following conditional probability distribution function (PDF):

$$P(\zeta|E_i) = \frac{(\Psi_i + \sigma_w^4)\sigma_h^2}{[(\zeta - E_i)^2\sigma_h^4 + 2\Psi_i + \sigma_w^4]^{3/2}}$$

where $\zeta$ is a decision variable and where $\psi_i = (\zeta - E_i)\sigma_w^2\sigma_h^2$.
where $E_i$ is: the energy of the transmitted symbol
where $\sigma_w^2$ is: the noise variance
where $\sigma_h^2$ is: the variance of the fading coefficients Preferably, the demodulation method further comprises making decisions for the detection of transmitted signals according to the following minimum distance detector (MDD) equation:

$$\hat{A}_i = \text{argmin}_{E_i}[\zeta - E_i]^2, \ i = [0, 1, \ldots, M-1],$$

where $\hat{A}_i$ is: the estimated symbol amplitude
where M is the modulation order.

Preferably, the MDD has a Signal to Error Ratio (SER) which follows the following equation:

$$P_S = 1 - \frac{1}{M} + \frac{1}{M}\left[\sum_{i=1}^{M-1}\lambda_i - \sum_{i=2}^{M}\chi_i\right],$$

where $$\lambda_i \triangleq \frac{1 - \delta^2[i - 0.5]\Gamma}{2\sqrt{(\delta^2[i - 0.5]\Gamma)^2 + 2\delta^2[2i^2 - 3i + 1.5]\Gamma + 1}}$$

$$\chi_i \triangleq \frac{1 + \delta^2[i - 0.5]\Gamma}{2\sqrt{(\delta^2[i - 1.5]\Gamma)^2 + 2\delta^2[2i^2 - 5i + 3.5]\Gamma + 1}}.$$

where $$\Gamma = \frac{\sigma_H^2}{\sigma_W^2}\bar{E},$$

and $\bar{E} = 1/M\Sigma_{i=0}^{M-1}E_i$ is the average power per symbol which is normalized to unity
where $P_S$ is: the symbol error probability
where $\chi_i$ is: already defined above
where $\delta$ is: amplitde difference between adjacent symbols
where $\Gamma$ is: average symbol energy Preferably, the attenuation channel coefficients are obtained by inserting pilot symbols within the transmitted signals with a particular time spacing, the pilot symbols having a constant modulus, $|s|^2 = P$, where P is a constant.

Preferably, an estimated value of the channel attenuation magnitude $|h|^2$ is obtained by computing $\alpha = \eta_P/|s|^2$,
Where
$$\eta_P = |v_P|^2 = |h|^2|s|^2 + (h^*s^*w + hsw^*) + |w|^2.$$

As another aspect of the invention, there is provided a demodulator device for detecting signals transmitted by a digital transmitter to a digital receiver through a communication channel, the channel having a channel attenuation $|h|$ and a channel phase shift having a multipath fading effect on the transmitted signals, the demodulator device being configured to communicate with the digital receiver for demodulating signals received by the receiver using channel coefficients representing the channel attenuation only without any knowledge of the channel phase shift.

Preferably, the demodulation is robust to phase noise, large phase variations and time-varying I-Q imbalance.

Preferably, the demodulator device uses a M-ary amplitude shift keying technique, the transmitted signals being modulated by the transmitter using said same technique before transmission using a modulation order M superior to 2.

Preferably, the detected signals have a Bit Error Rate (BER) intermediate in terms of performance between a coherent detection and a differentially coherent detection assuming a same spectral efficiency.

Preferably, the demodulator device is less complex than a coherent demodulator, and wherein the BER performance of the detected signals using the demodulator is substantially similar to a BER performance obtained using a coherent demodulator.

Preferably, the channel is a multi-path fading channel. The multi-path fading channel can be for example Rayliegh, Ricean or Nakagami.

Preferably, the received signals have an energy $\eta$ and the channel attenuation coefficients have a magnitude $|h|^2$, and wherein the demodulator is configured to equalize the energy of the receivd sginals $\eta$ using only the manguitude of the channel coefficients $|h|^2$ such that an equalized envelop of the received signals is obtained according to the following equation in which the multipath fading effect of the channel on the transmitted signals is converted into an additive disturbance:

$$\zeta = \frac{\eta}{|h|^2} = \frac{|v|^2}{|h|^2} = |A_i^2| + \frac{1}{|h|^2}[(h^*A_i^*w + hA_iw^*) + |w|^2].$$

where $\zeta$ is: the energy equalized signal
where $v$ is: the received signal
where $A_i^2$ is: the energy of the transmitted symbol where w is: additive white Gaussian noise
where (.)* denotes the complex conjugate.

Preferably, the demodulator device makes decisions for the detection of transmitted signals according to the following conditional probability distribution function (PDF):

$$P(\zeta \mid E_i) = \frac{(\Psi_i + \sigma_w^4)\sigma_h^2}{[(\zeta - E_i)^2 \sigma_h^4 + 2\Psi_i + \sigma_w^4]^{3/2}}$$

where $\zeta$ is a decision variable and where $\psi_i = (\zeta + E_i)\sigma_w^2 \sigma_h^2$.
where $E_i$ is: the energy of the transmitted symbol
where $\sigma_w^2$ is: the noise variance
where $\sigma_h^2$ is: the variance of the fading coefficients Preferably, the demodulator device makes decisions for the detection of transmitted signals according to the following minimum distance detector (MDD) equation:

$$\hat{A}_i = \text{argmin}_{E_i}[\zeta - E_i]^2, \ i=[0,1,\ldots,M-1],$$

where $\hat{A}_i$ is: the estimated symbol amplitude
where M is the modulation order.

Preferably, the MDD has a Signal to Error Ratio (SER) which follows the following equation:

$$P_S = 1 - \frac{1}{M} + \frac{1}{M}\left[\sum_{i=1}^{M-1}\lambda_i - \sum_{i=2}^{M}\chi_i\right],$$

where $$\lambda_i \triangleq \frac{1 - \delta^2[i - 0.5]\Gamma}{2\sqrt{(\delta^2[i - 0.5]\Gamma)^2 + 2\delta^2[2i^2 - 3i + 1.5]\Gamma + 1}}$$

$$\chi_i \triangleq \frac{1 + \delta^2[i - 0.5]\Gamma}{2\sqrt{(\delta^2[i - 1.5]\Gamma)^2 + 2\delta^2[2i^2 - 5i + 3.5]\Gamma + 1}}$$

where $$\Gamma = \frac{\sigma_H^2}{\sigma_w^2}\bar{E},$$

and $\bar{E} = 1/M \Sigma_{i=0}^{M-1} E_i$ is the average power per symbol which is normalized to unity
where $P_s$ is: the symbol error probability
where $\chi_i$ is: already defined above
where $\delta$ is: amplitde difference between adjacent symbols
where $\Gamma$ is: average symbol energy Preferably, the attenuation channel coefficients are obtained by inserting pilot symbols within the transmitted signals with a particular time spacing, the pilot symbols having a constant modulus, $|s|^2 = P$, where P is a constant.

Preferably, an estimated value of the channel attenuation magnitude $|h|^2$ is obtained by computing $\alpha = \eta_P/|s|^2$,
Where $$\eta_P = |v_P|^2 = |h|^2|s|^2 + (h^*s^*w = hsw^*) + |w|^2.$$

As a further aspect of the invention, there is provided a digital communication system comprising a transmitter, a receiver and a demodulator implementing the demodulation technique in accordance with the various embodiments of the present invention.

As a further aspect of the invention, there is provided a computer readable medium embedding computer instructions configured to execute the demodulation technique in accordance with the various embodiments of the present invention.

DRAWINGS

The invention will now be described with reference to the accompanying drawings, which illustrate a preferred embodiment of the present invention without restricting the scope of the invention's concept, and in which.

DETAILED DESCRIPTION OF THE INVENTION

MASK Modulation

In MASK modulation, the baseband representation of the transmitted signal is given $$d = A_i, \ i \in \{0,1,\ldots,M-1\} \tag{1}$$

where M is the modulation order, the amplitudes $A_i \in \mathbb{R}$ for coherent detection, while for NCD $A_i \geq 0$. Without loss of generality, the amplitudes are selected such that $A_{i+1} > A_i$. Moreover, the amplitude spacing is usually assumed to be uniform where $A_{i+1} - A_i = \delta$. Since the average symbol power is normalized to unity, then $1/M \Sigma_{i=0}^{M-1} A_i^2 = 1$. The transmitted amplitudes can be described by, $$A_i = i \times \delta, \ i \in \{0,1,\ldots,M-1\}, \tag{2}$$

where $$\delta = \sqrt{\frac{6}{(2M-1)(M-1)}}. \tag{3}$$

Conventional NC MASK Detection

Figure 1:
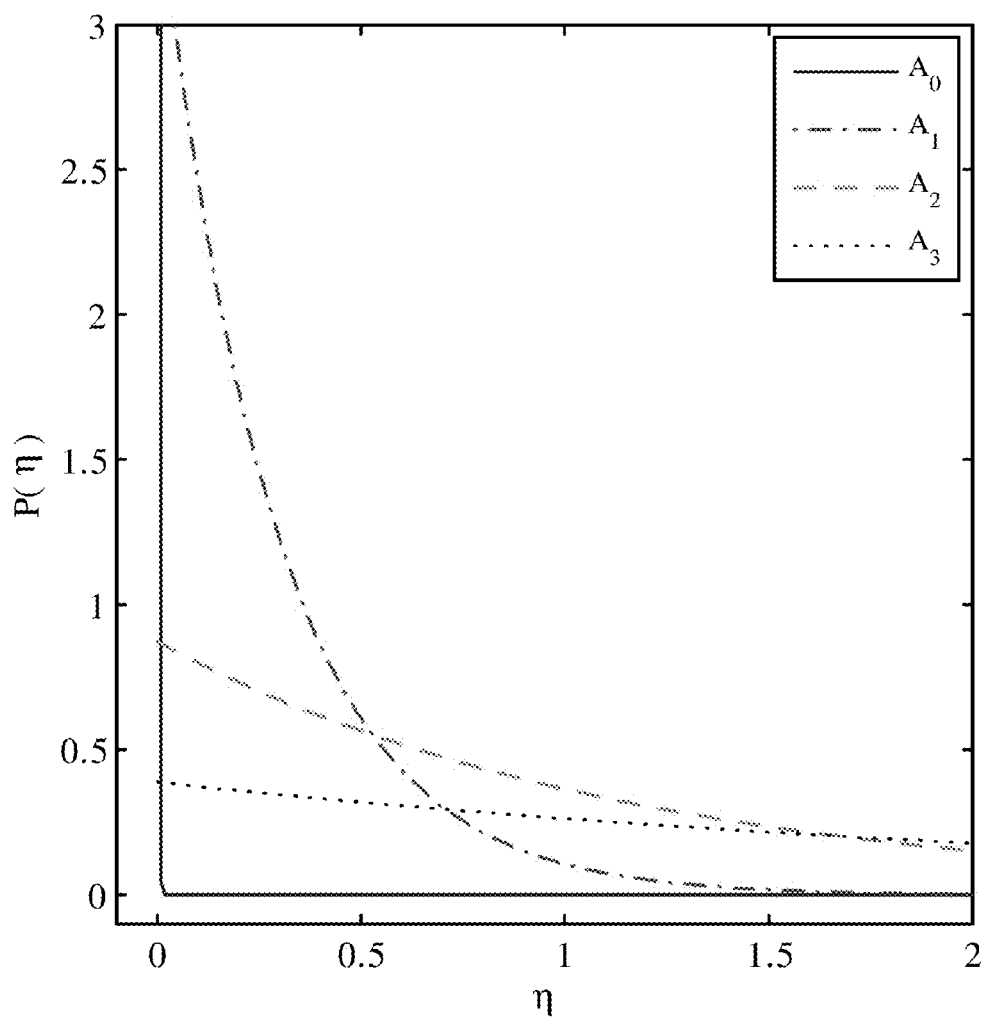
FIG. 1 illustrates the PDF of a conventional NCD decision variables for M=4 and SNR=30 dB.

Assuming that the information symbols are transmitted over a Rayleigh frequency-flat fading channel, the received signal can be expressed as $$v = hA_i + w, \ i \in \{0,1,\ldots,M-1\} \tag{4}$$

where the channel fading coefficient h is a complex normal random variable $h \sim CN(0, 2\sigma_H^2)$ and $w \sim CN(0, 2\sigma_w^2)$ denotes the additive white Gaussian noise (AWGN). To perform NCD, the energy of the received signal should be computed, $$\eta = |v|^2 = |h|^2 |A_i^2| + (h^* A_i^* w + h A_i w^*) + |w|^2. \quad (5)$$

where $(.)^*$ denotes the complex conjugate. The received signal energy $\eta$ is the decision variable that will be fed to the maximum likelihood detector (MLD). The conditional probability distribution function (PDF) of $\eta$ can be expressed as $$P(\eta | E_i) = \frac{1}{2(\sigma_w^2 + \sigma_h^2 E_i)} \exp\left(-\frac{1}{2} \frac{\eta}{\sigma_w^2 + \sigma_h^2 E_i}\right), \quad (6)$$

where $E_i = A_i^2$. The PDF in (6) for M=4 is shown in FIG. 1 where it is clear that the only amplitude that can be identified easily is the $A_0 = 0$ case. For all other symbols, the probability of error is very high. Consequently, NCD of MASK can provide reliable symbol error rate (SER) only for the M=2 case, which leads to low spectral efficiency.

Based on the PDF given in (6), the MLD can be expressed as [5], $$\hat{A}_i = \arg\min_{A_i} \frac{\eta}{(\sigma_w^2 + \sigma_h^2 E_i)} + \ln(\sigma_w^2 + \sigma_h^2 E_i), \, i = [0, 1, \ldots, M-1]. \quad (7)$$

It is worth noting that the MLD of NCD of MASK requires accurate knowledge of $\sigma_w^2$ and $\sigma_h^2$. The SER using MLD can be expressed as [5], $$P_S = 1 - \frac{1}{M} + \frac{1}{M} \sum_{i=1}^{M-1} \exp\left[-\frac{\ln\left(\frac{\Gamma_{i+1} + 1}{\Gamma_i + 1}\right)}{1 - \frac{\Gamma_i + 1}{\Gamma_{i+1} + 1}}\right] - \exp\left[-\frac{\ln\left(\frac{\Gamma_{i+1} + 1}{\Gamma_i + 1}\right)}{\frac{\Gamma_{i+1} + 1}{\Gamma_i + 1} - 1}\right] \quad (8)$$

where $$\Gamma_i = \frac{\sigma_h^2}{\sigma_w^2} E_i.$$

Figure 3:
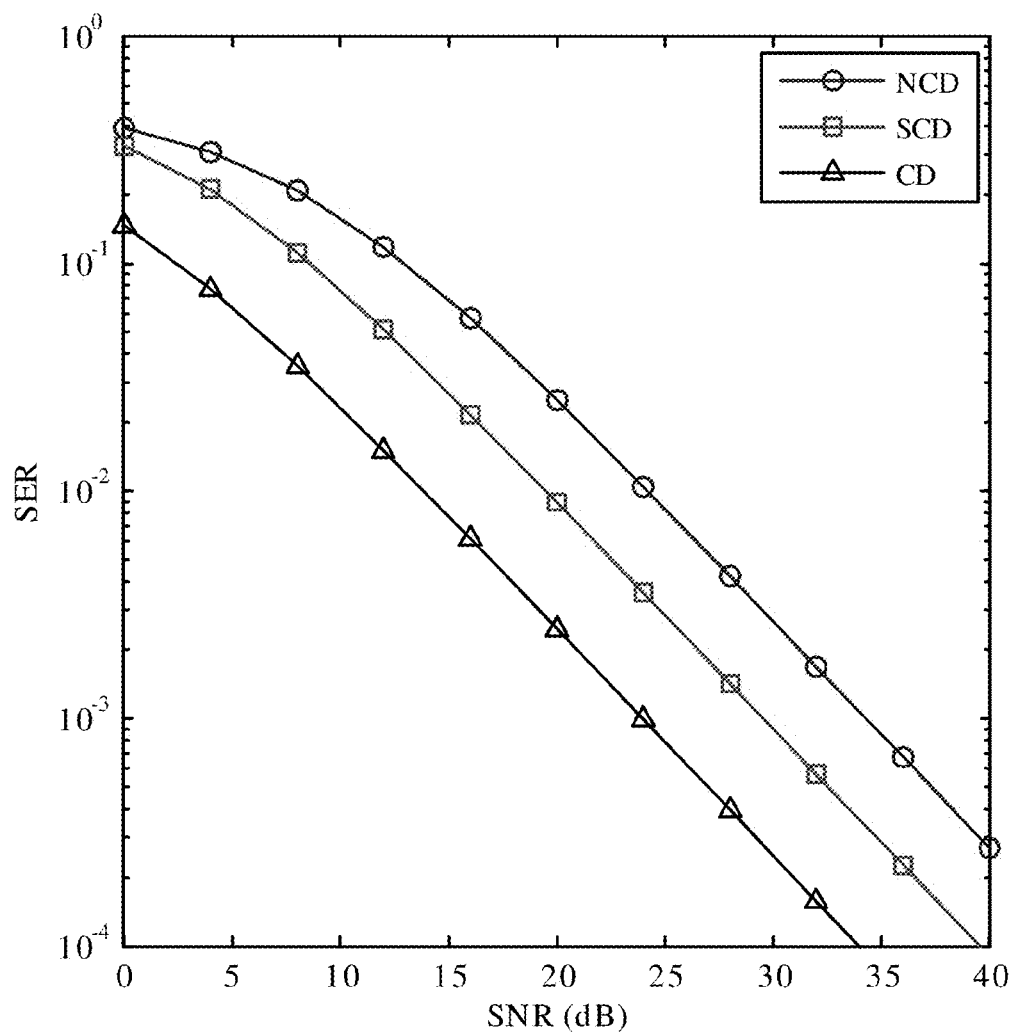
FIG. 3 illustrates SER of CD, NCD and SCD using MLD, M=2.
Figure 4:
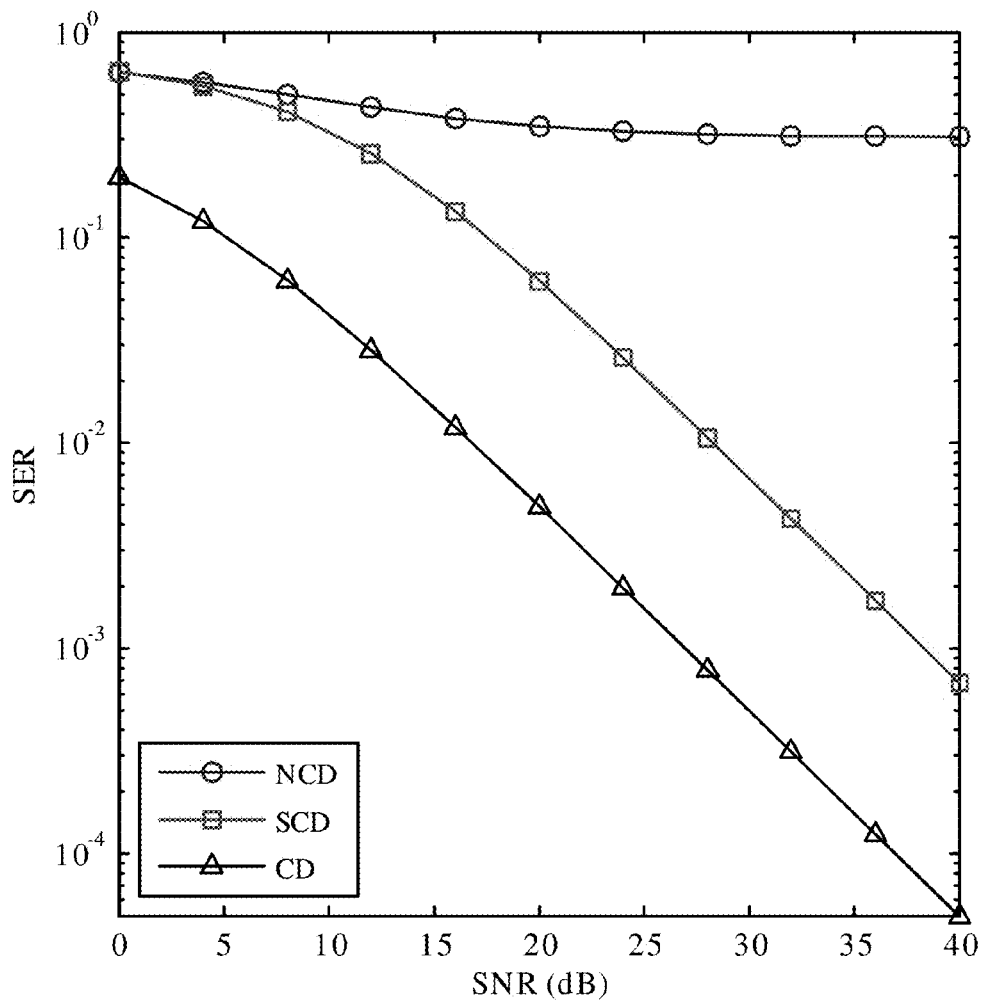
FIG. 4 illustrates SER of CD, NCD and SCD using MLD, M=4.

The SER of the NCD-MASK for M=2 using optimal MLD is presented in FIG. 3. As it can be noted from the figure, the SER is decreasing as a function of SNR, which implies that the NCD of MASK where M=2 can provide reliable SER at high SNR values. As it can be noted from the figure, the performance degradation of the NCD as compared to the CD is equivalent to 10 dB. Unlike the M=2 case, the M=4 SER depicted in FIG. 4 shows that NCD is prohibitively high to be incorporated in any practical application. As it can be seen from the figure, the NCD suffers from an error floor at SER ~0.3. The SER for the CD in Rayleigh fading channels is reported in [6].

The New Semi-Coherent Demodulator

To eliminate the impact of the multiplicative fading we introduce the new SCD, which can be obtained by equalizing the received symbols energy using only the magnitude of the channel coefficients. The equalized envelop $\zeta$ can be expressed as $$\zeta = \frac{\eta}{|h|^2} = \frac{|v|^2}{|h|^2} = |A_i^2| + \frac{1}{|h|^2}[(h^* A_i^* w + h A_i w^*) + |w|^2]. \quad (9)$$

As depicted in (9), the multiplicative effect of multipath fading has been converted into an additive disturbance. The process of computing $|h|^2$ for practical systems will be presented in the following sections.

Figure 2:
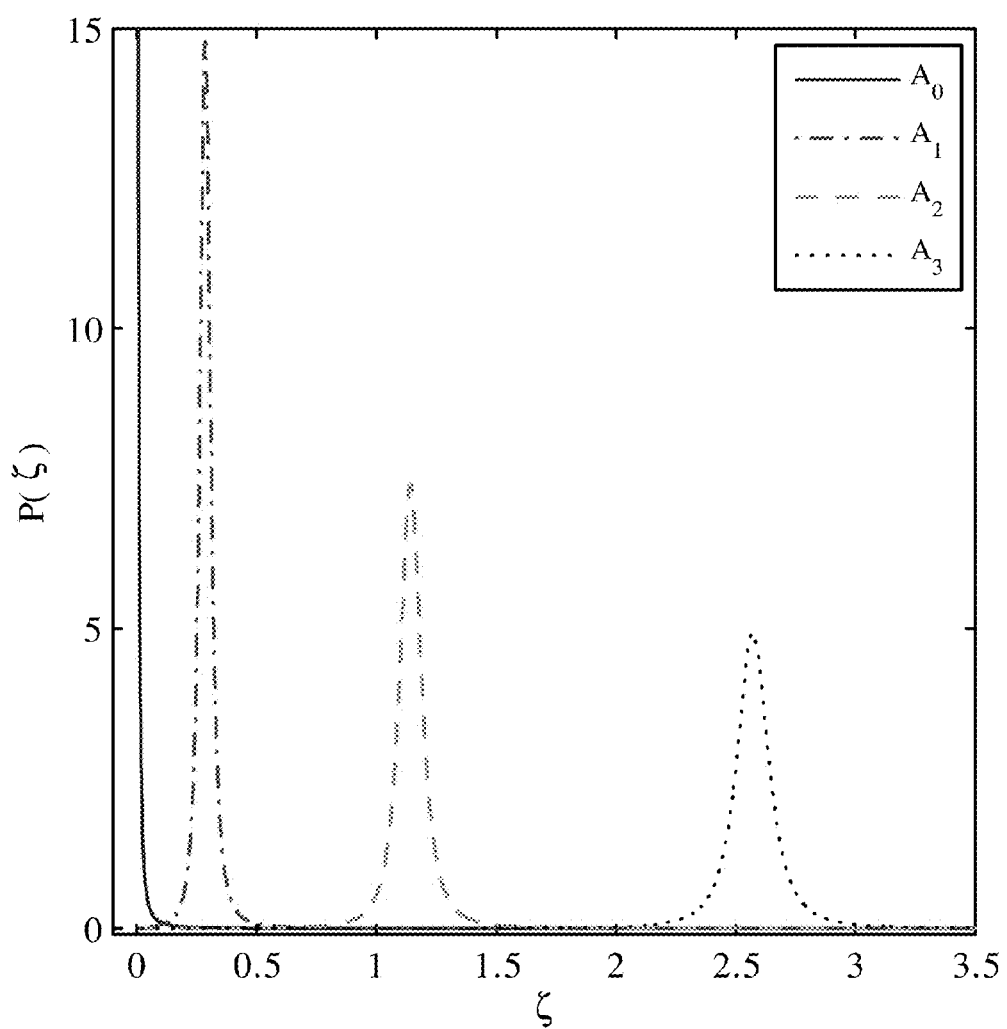
FIG. 2 illustrates the PDF of SCD decision variables for M=4 and SNR=30 dB.

The conditional PDF of the decision variable $\zeta$ is given by $$P(\zeta | E_i) = \frac{(\Psi_i + \sigma_w^4)\sigma_h^2}{[(\zeta - E_i)^2 \sigma_h^4 + 2\Psi_i + \sigma_w^4]^{3/2}} \quad (10)$$

where $104_i = (\zeta + E_i)\sigma_w^2 \sigma_h^2$. As it can be noted from FIG. 2 that considers the M=4 case, the conditional PDFs are well separated and the tails of both PDFs decay rapidly as a function of $\zeta$ which implies that the SER will be much lower than that of the conventional non-coherent detectors. Moreover, it can be noted that the peak values of the PDF is inversely proportional to the transmitted amplitude, which is uncommon in most conventional systems.

The SER of the SCD using MLD is presented in FIGS. 3 and 4 for M=2 and 4, respectively. As it can be noted from both figures, the SER of the SCD significantly outperforms NCD. Moreover, SCD managed to provide reliable SER for M>2, which implies that it can provide higher spectral efficiency as compared to NCD. Furthermore, it can be noted from FIG. 3 that the SER degradation of SCD as compared to CD is about 5.5 dB at SER of $10^{-3}$, and it is about 11 dB when M=4.

Based on the PDF given in (10), it can be shown that the optimum detector has high complexity, and it requires the knowledge of $\sigma_w^2$ and $\sigma_h^2$. Consequently, suboptimal solutions should be considered. Towards this goal, it is straightforward to show that in high SNR scenarios, an efficient suboptimal detector for SCD can be expressed as $$\hat{A}_i = \arg\min_{E_i} [\zeta - E_i]^2, \, i = [0, 1, \ldots, M-1], \quad (11)$$

which corresponds to the minimum distance detector (MDD). The SER based on MDD can be expressed as $$P_S = 1 - \frac{1}{M} + \frac{1}{M}\left[\sum_{i=1}^{M-1} \lambda_i - \sum_{i=2}^{M} \chi_i\right], \quad (12)$$

where $$\lambda_i \triangleq \frac{1 - \delta^2[i - 0.5]\Gamma}{2\sqrt{(\delta^2[i - 0.5]\Gamma)^2 + 2\delta^2[2i^2 - 3i + 1.5]\Gamma + 1}}$$

$$\chi_i \triangleq \frac{1 + \delta^2[i - 0.5]\Gamma}{2\sqrt{(\delta^2[i - 1.5]\Gamma)^2 + 2\delta^2[2i^2 - 5i + 3.5]\Gamma + 1}}.$$

where $$\Gamma = \frac{\sigma_H^2}{\sigma_w^2}\overline{E},$$

and $\overline{E} = 1/M \sum_{i=0}^{M-1} E_i$ is the average power per symbol which is normalized to unity for all systems.

Figure 5:
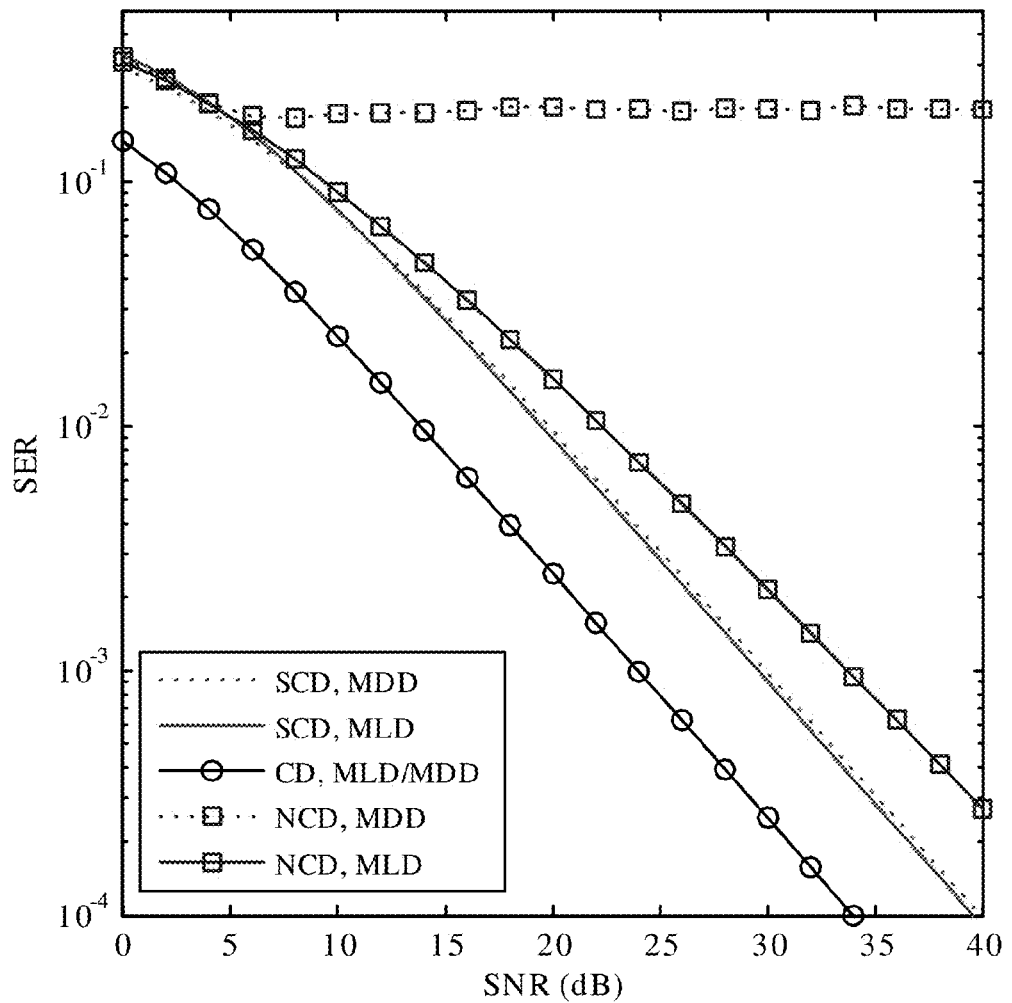
FIG. 5 illustrates SER of CD, SCD and NCD using MLD and MDD, M=2.

The SER for M=2 is shown in FIG. 5 using MLD and MDD. Because the MLD and MDD have equal SER for the CD, only one curve is presented. As it can be noted from the figure, the SER degradation of SCD as a result of using MDD is negligible while it is substantial for the NCD case. Consequently, the MDD for SCD offers near-optimal SER with low complexity.

Partial CSI Estimation

As it can be noted from (9), the partial CSI required for the SCD is the channel attenuation coefficient $|h|^2$. The most straightforward approach to obtain $|h|^2$ is to insert pilot symbols within the information symbols with a particular time spacing. The spacing between the pilot symbols can be optimized based on the channel variations in the time domain. For quasi static and slowly varying channels, the number of pilots is insignificant and hence, the spectral efficiency degradation becomes negligible. The main requirement for the pilot symbols is to have a constant modulus, $|s|^2=P$, where P is a constant. Therefore, the energy of the received signal when a pilot symbol s is transmitted can be expressed as, $$\eta_P = |v_P|^2 = |h|^2|s|^2 + (h^*s^*w + hsw^*) + |w|^2. \tag{13}$$

The estimated value of $|h|^2 \dot{=} \alpha$ can be obtain by computing $\hat{\alpha} = \eta_P/|s|^2$.

The channel variations over time can be described using Jake's model [7]. Assuming that the channel is Rayleigh fading with $L_h$ independent multipath components, the time correlation between the channel coefficients can be expressed as, $$E[h_n h_m] = \beta_l J_0(2\pi f_d T_s(n-m)), \tag{14}$$

where $T_s$ is the symbol period, $\beta_l$ is the normalized power of the lth multipath component where $\Sigma_{l=0}^{L_h} \beta_l = 1$, $J_0(.)$ is the Bessel function of the first kind and zero order and $f_d$ is the maximum Doppler shift. Therefore, the time variation over few consecutive symbols is small. In broadband communications, the ratio of number of pilot symbols to the information symbols is one of the main factors that determine the system spectral efficiency. Typically, the pilot spacing in the time domain is about 4 symbols [8]-[13].

Numerical Results

In the previous parts, the SER performance was obtained under ideal channel conditions and perfect channel estimation. Therefore, this section presents the SER in the presence of mobility, channel estimation errors, and phase noise.

Figure 6:
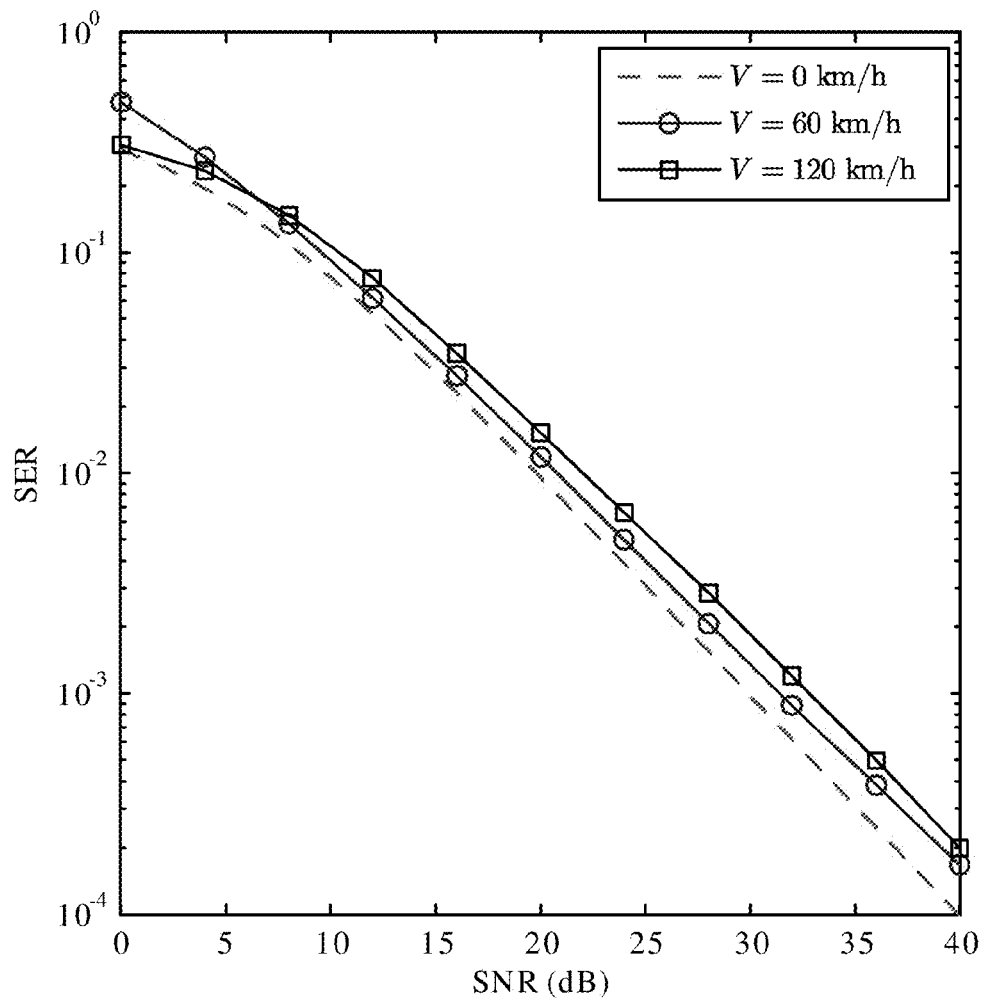
FIG. 6 illustrates SER of SCD for various vehicle speeds with imperfect channel estimates, M=2.

The SER of the SCD in the presence of mobility is presented in FIG. 6 using M=2. The channel is assumed to be Rayleigh frequency-nonselective with time correlation that follows the Jake's model. The bit rate is set to 2 Mbps and the carrier frequency is 2.4 GHz. The pilot symbols are inserted periodically with a separation of 4 data symbols. The channel attenuation at the non-pilot symbols is obtained using linear interpolation. As it can be noted from the figure, the SER degradation is less than 3 dB for a vehicle speed (V) of 120 km/h and it is about 2 dB when V=60 km/h. Although such degradation is generally acceptable at such high speeds, the SER can still be improved using more accurate interpolation techniques.

Figure 7:
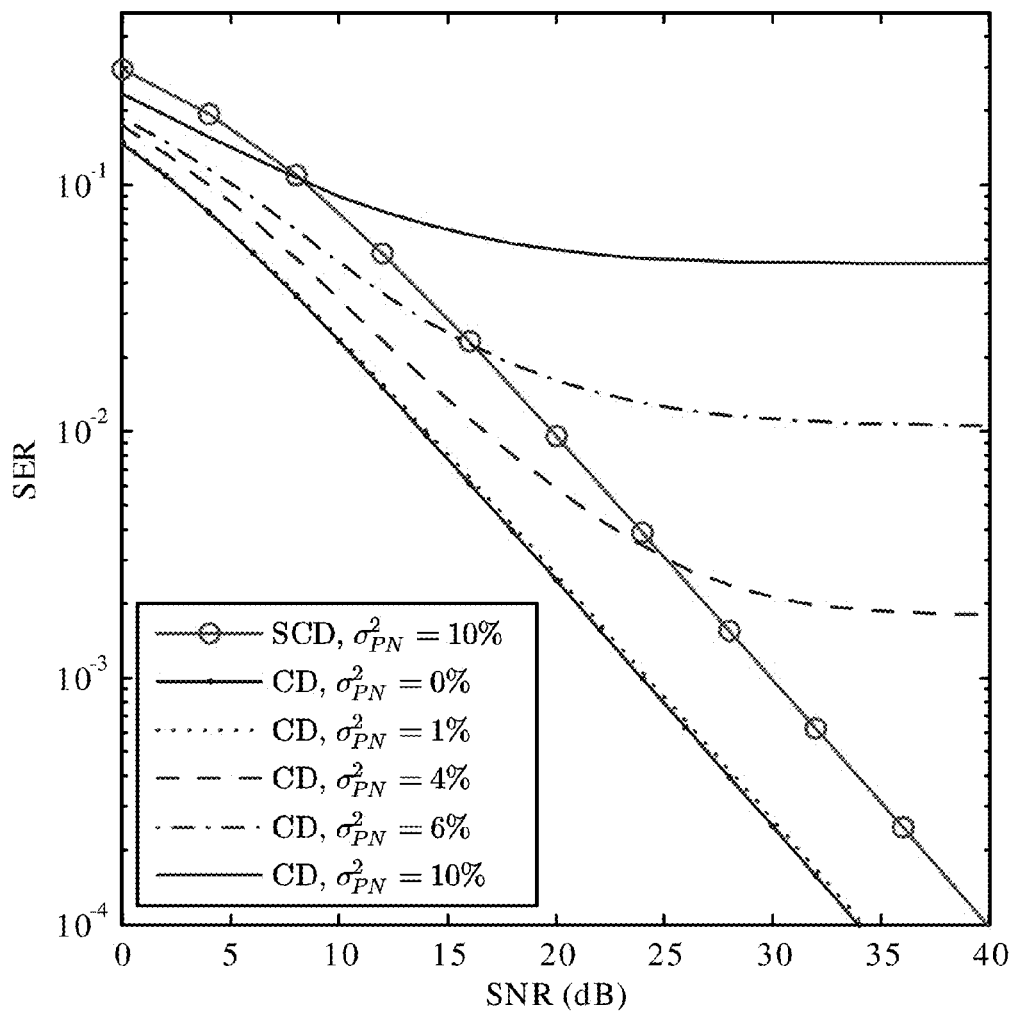
FIG. 7 illustrates SER of CD and SCD using different $\sigma_{PN}^2$ values.

The SER of SCD and CD in the presence of phase noise (PN) is presented in FIG. 7 The received signal in the presence of PN can be expressed as $$v = he^{j\phi}A_i + w, \; i \in \{0, 1, \ldots M-1\}$$

where $\phi$ is a function of the phase noise power, and it is typically modeled as a random jitter $\phi \sim N(0, \sigma_{PN}^2)$ [14], where $\sigma_{PN}^2$ is measured in rad$^2$. As it can be noted from the figure, the SER of SCD is independent of the PN, which is expected because the SER depends only on the magnitude of the channel response. On the contrary, CD is sensitive to PN particularly at high values of $\sigma_{PN}^2$. It is worth noting that PN can be caused by the transmitter and receiver frequency jitter, timing and frequency synchronization, and channel estimation error, therefore, large PN values might be experienced in particular system and channel conditions [14].

The new receiver for digital communication systems proposed is based on a novel demodulation technique that requires only partial knowledge of the channel state information, which simplifies the channel estimation process. The error rate performance of the new receiver is substantially lower than that of the conventional non-coherent demodulators. The proposed system enables high spectral efficiency implementation of digital communication systems by exploiting the pilots for joint data transmission and channel estimation.

Blind CSI Estimation Using Amplitude-Coherent Detection

In this section, we propose a low complexity blind channel estimation technique using ACD. As it can be noted from aforementioned discussion, the partial CSI required for the ACD is the channel attenuation coefficient $\alpha$. The most straightforward approach to obtain $\alpha$ is to insert pilot symbols within the information symbols, and then use least-squared estimation to compute $\alpha$. The main requirement for the pilot symbols is to have a known amplitudes at the detector side. Therefore, without loss of generality, we assume that the pilot symbols $d_{PSK}^{\{l\}}$ satisfy $|d_{PSK}^{\{l\}}|^2 = C^{\{l\}} = 1 \forall l$. Since MPSK has constant modulus, we assume that all pilot symbols are MPSK modulated.

If the pilot and data symbol during the lth signaling interval are denoted by $d_{PSK}^{\{l\}}$ and $d_{ASK}^{\{l\}}$, respectively, then the transmitted frame has generally the following structure, $$d = [d_{PSK}^{\{1\}}, s_{ASK}^{\{2\}}, \ldots, d_{ASK}^{\{Q\}}, d_{ASK}^{\{Q+1\}},$$
$$d_{ASK}^{\{Q+2\}}, \ldots, d_{ASK}^{\{2Q\}}, d_{PSK}^{\{2Q+1\}}, \ldots]. \tag{15}$$

The value of Q depends on the channel coherence time, spectral efficiency, interpolation error tolerance, etc.

Using least square estimation, the channel attenuation factor obtained from the lth pilot symbol can be expressed as, $$\hat{\alpha} = \frac{|r_{PSK}|^2}{|d_{PSK}|^2} \tag{16}$$
$$= \alpha + h^* d_{PSK}^* w + h d_{PSK} w^* + |w|^2$$

where $r_{PSK}$ is the received signal that corresponds to a given pilot symbol. Similar to conventional coherent systems, the channel estimates can be used to form the following sparse vector $$a = [\hat{\alpha}^{\{1\}}, 0^{\{2\}}, \ldots, 0^{\{Q\}}, \hat{\alpha}^{\{Q+1\}}, 0^{\{Q+2\}}, \ldots,$$
$$0^{\{2Q\}}, \hat{\alpha}^{\{2Q+1\}}, \ldots], 2Q+1=L. \tag{17}$$

Then, interpolation can used to compute $\hat{\alpha}^{\{l\}}$ where =l mod Q≠1. Finally, the data symbols can be detected by computing $\hat{d}_{ASK}^{\{l\}} = |r_{ASK}^{\{l\}}|^2/\hat{\alpha}^{\{l\}}$, l mod Q≠1.

As it can be noted from the aforementioned discussion, the pilot symbols design and channel estimation approach used are generally similar to those used in coherent detection. However, it is interesting to note that once $\hat{d}_{ASK}^{\{l\}}$ is obtained, then the full CSI can be obtained for all data symbols where $\hat{h}_{ASK}^{\{l\}} = r_{ASK}^{\{l\}}/\hat{d}_{ASK}^{\{l\}}$, l mod Q≠1. Then, interpolation can be used to find $\hat{h}_{PSK}^{\{l\}}$, l mod Q=1, which allows constructing the vector $\hat{h} = [\hat{h}^{\{1\}}, \hat{h}^{\{2\}}, \ldots, \hat{h}^{\{L\}}]$.

Figure 8:
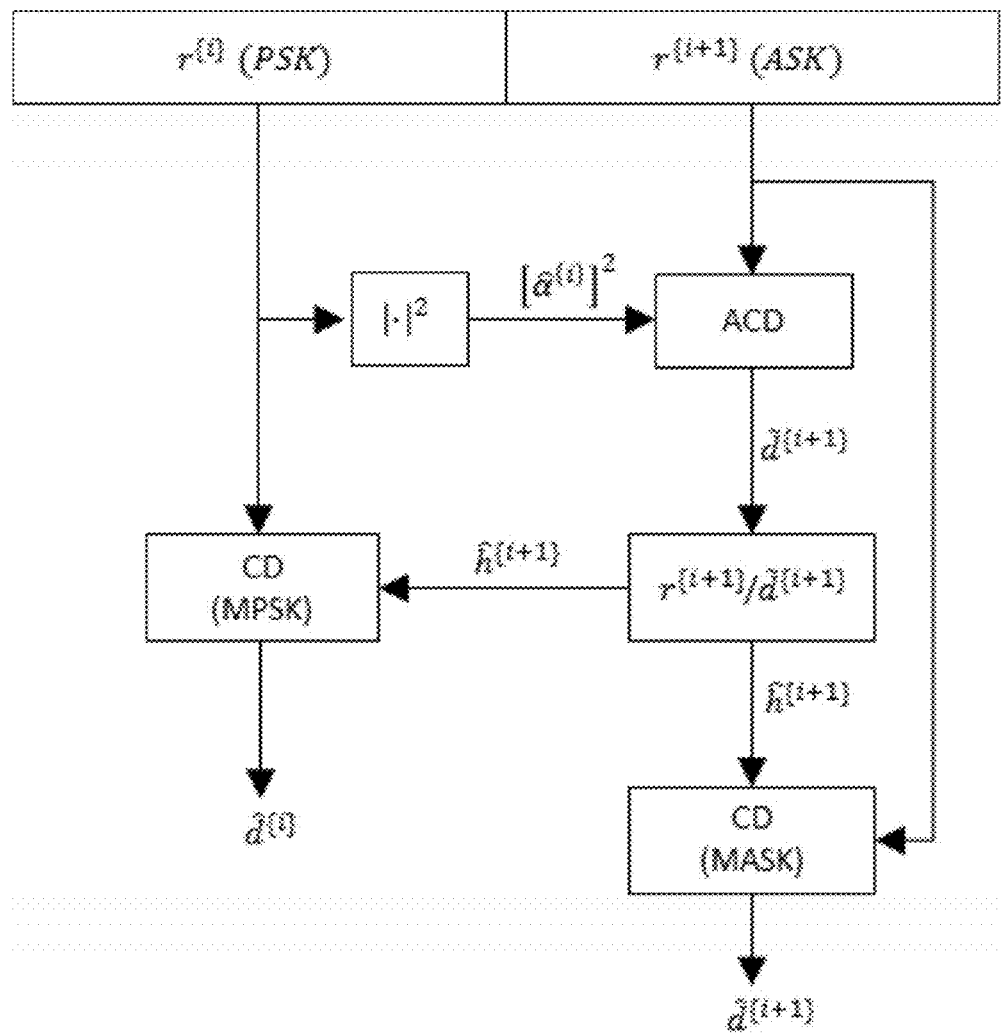
FIG. 8 illustrates proposed blind CSI estimation using amplitude-coherent detection using a simple frame structure, where each frame is composed of two symbols, one ASK and PSK.

Consequently, the entire received vector can be detected coherently $$\hat{d} = \hat{H}\hat{H}^H r \quad (18)$$

where $r=[r^{\{1\}}, r^{\{2\}}, \ldots, r^{\{L\}}]$, $\hat{H}=\text{diag}\{\hat{h}^{\{1\}}, \hat{h}^{\{2\}}, \ldots, \hat{h}^{\{L\}}\}$, and (.) denotes the Hermitian transpose operation. Therefore, if the pilot symbols are regular MPSK data-bearing symbols, then the data can be recovered and utilized. In this sense, the data and pilot symbols exchange their roles recursively to estimate the CSI and detect the data with low complexity and no power or spectrum penalties. FIG. 8 shows the proposed technique using a simple frame structure, where each frame is composed of two symbols, one ASK and PSK. The interpolation is not required in such scenarios because $h^{\{l\}} \approx h^{\{l+1\}}$.

Because both $d_{PSK}$ and $d_{ASK}$ symbols are bearing data, none of them should be referred to as pilot symbol. Moreover, the ratio between the number of PSK and ASK symbols is channel and system dependent. However, PSK SER is typically lower than ACD. Therefore, the number of PSK symbols can be increased to provide lower SER as long as the separation between ASK symbols is small enough to provide accurate channel estimation.

It is important to note that using $A_0=0$ for channel estimation with ACD should be avoided since the channel coefficient is undefined in such scenarios. A simple solution to resolve this matter is to use $A_m=(m+1)\times\delta$, $m\in\{0,\ldots,M-1\}$. For an average power $1/M\Sigma_{m=1}^{M} E_m=1$ and equally spaced constellation points, the amplitude separation can be defined as $s_{m+1}-s_m \doteq \delta$, where $$\delta = \sqrt{\frac{6}{(M+1)(2M+1)}}.$$

Therefore, $P_s$ can be expressed as $$P_S = 1 - \frac{1}{M} + \frac{1}{M}\sum_{i=1}^{M-1} A_i - B_{i+1} \quad (5)$$

$$A_i \triangleq \frac{1 - \delta^2[i+0.5]\Gamma}{2\sqrt{(\delta^2[i+0.5]\Gamma)^2 + 2\delta^2[2i^2 + i + 0.5]\Gamma + 1}}$$

$$B_i \triangleq \frac{1 + \delta^2[i-0.5]\Gamma}{2\sqrt{(\delta^2[i-0.5]\Gamma)^2 + 2\delta^2\Gamma 2i^2 - i + 0.5] + 1}}.$$

It is worth noting that the SER when $A_0>0$ is higher than the case where $A_0=0$ due to the loss of power efficiency. Such limitation can be avoided by setting $A_0=0$, however, CSI over the entire frame has to be recovered from nonuniformly spaced samples [15].

Numerical Results of the Blind Detection Technique

Figure 9:
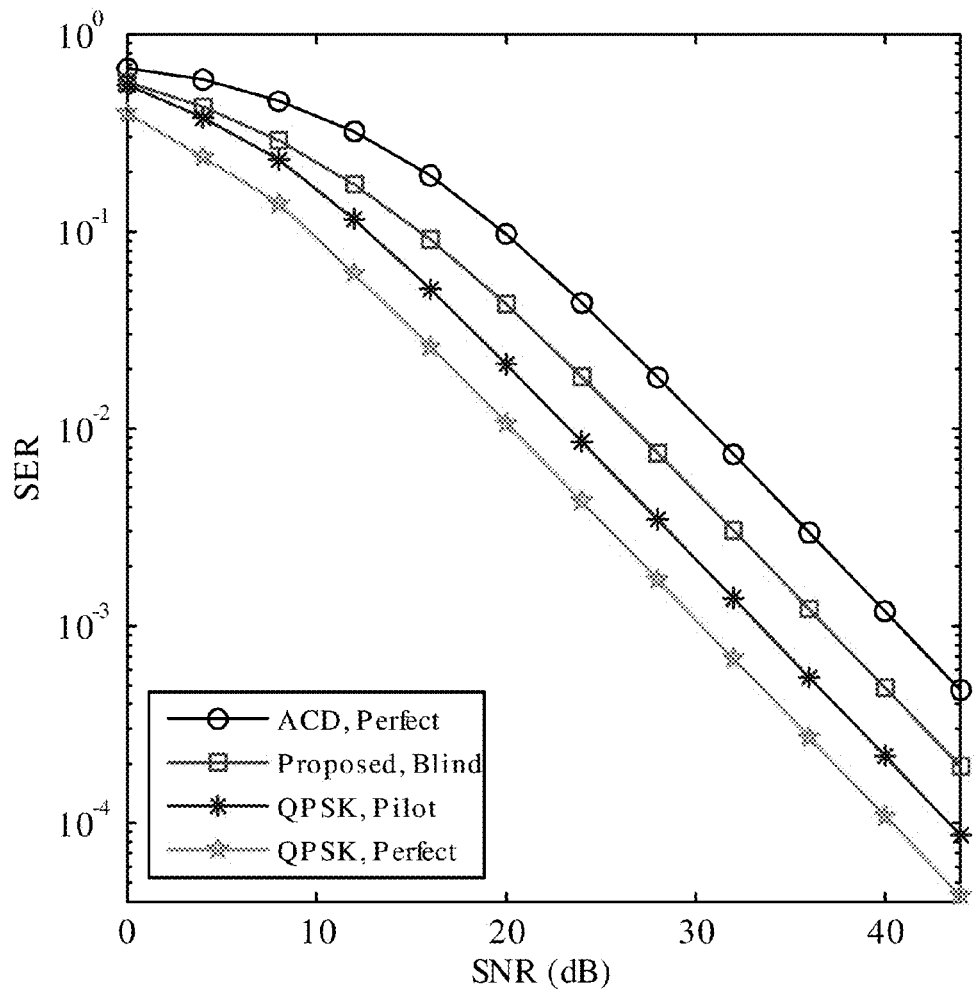
FIG. 9 shows the SER using the proposed blind channel estimation algorithm compared to QPSK modulation under different scenarios.

FIG. 9 shows the SER using the proposed blind channel estimation algorithm compared to QPSK modulation under different scenarios. The results are obtained for N=1 and M=4 regardless of the modulation type. The transmitted frames for QPSK modulation with pilot estimation are composed of 5 symbols with QPSK modulation, 4 data symbols and one pilot, and all symbols have equal power. The proposed hybrid frame comprises of 5 symbols as well, 4 QPSK modulated and one with 4-ASK modulation. The channel is assumed to be quasi-static Rayleigh fading where the channel parameters remain fixed over one frame period, while they changes randomly at different frame periods. As it can be noted from the figure, the pure ACD with perfect channel estimation exhibits the highest SER. Such performance is obtained because MASK is less power efficient than QPSK even under imperfect channel estimation conditions. However, the SER of the hybrid frame using the proposed channel estimation exhibits a 4 dB improvement over MASK with ACD at SER=$10^{-3}$. The SER of conventional QPSK with pilot based channel estimation leads the proposed system by about 3.5 dB. However, such SER performance improvement is obtained at the expense of spectral efficiency. Moreover, the SER degradation is caused partially by channel estimation errors and the higher SER of the MASK symbol used within the frame. Nevertheless, the proposed blind channel estimation demonstrated a highly reliable results with 100% spectral efficiency. Moreover, the performance gap could be less under more severe channel models such as the ones with strong phase noise.

REFERENCES

[1] J. Proakis and M. Salehi, Digital Communications, 4th Edition, McGrawhill, 2001.

[2] A. Al-Dweik and F. Xiong, "Frequency-hopped multiple-access communications with noncoherent M-ary OFDM-ASK,", IEEE Transactions on Communications, vol. 51, no. 1, pp. 33-36, January 2003.

[3] D. Divsalar and M. Simon, "Multiple-symbol differential detection of MPSK," IEEE Transactions on Communications, vol. 38, no. 3, pp. 300-308, March 1990.

[4] O. Ozdemir, R. Hamila, and N. Al-Dhahir, "Exact Average OFDM Subcarrier SINR Analysis Under Joint Transmit—Receive I/Q Imbalance," IEEE Transactions on Vehicular Technology, vol. 63, no. 8, pp. 4125-4130, October 2014.

[5] R. Mallik and R. Murch, "Noncoherent Reception of Multi-Level ASK in Rayleigh Fading with Receive Diversity," IEEE Transactions on Communications, vol. 62, no. 1, pp. 135-143, January 2014.

[6] M. Simon and M. Alouini, Digital Communication over Fading Channels—A Unified Approach to Performance Analysis, 1st Ed., Wiley, 2000.

[7] W. C. Jakes, Microwave Mobile Communications. Piscataway, N.J.: IEEE Press, 1994.

[8] Radio broadcasting systems; digital audio broadcasting (DAB) to mobile, portable and fixed receivers, ETS Standard 300 401, 1995.

[9] Digital video broadcasting (DVB); framing structure, channel coding and modulation for digital terrestrial television, ETSI Standard EN 300744 v1.6.1, 2008.

[10] IEEE Standard for Local and metropolitan area networks Part 16: Air Interface for Broadband Wireless Access Systems Amendment 3: Advanced Air Interface, IEEE Standard 802.16m, 2011.

[11] LTE; Evolved Universal Terrestrial Radio Access (E-UTRA) and Evolved Universal Terrestrial Radio Access Network (E-UTRAN); Overall description, 3GPP Standard TS 36.300, 2011.

[12] IEEE 802.11p: Wireless LAN Medium Access Control (MAC) and Physical Layer (PHY) Specifications Amendment 6: Wireless Access in Vehicular Environments, July 15, 2010.

[13] IEEE Standard for Broadband over Power Line Networks: Medium Access Control and Physical Layer Specifications, IEEE Standard 1901, 2010.

[14] R. Krishnan, A. Graell, T. Eriksson and G. Colavolpe, "Constellation Optimization in the Presence of Strong Phase Noise," IEEE Transactions on Communications, vol. 61, no. 12, pp. 5056-5066, Dec. 2013.

[15] S. Maymon and V. Oppenheim, "Sinc interpolation of nonuniform samples," IEEE Trans. Signal Process., vol. 59, no. 10, pp. 4745-4758, October 2011.

The invention claimed is:

1. A digital communication receiver for detecting signals transmitted by a digital transmitter through a communication channel, the channel having a channel attenuation |h| and a channel phase shift having a multipath fading effect on the transmitted signals, the receiver comprising a demodulator configured to demodulate signals received by the receiver using channel coefficients representing the channel attenuation only without any knowledge of the channel phase shift, wherein:

the demodulator is robust to phase noise, large phase variations and time-varying I-Q imbalance;

the demodulator uses a M-ary amplitude shift keying technique, the transmitted signals being modulated by the transmitter using said same technique before transmission using a modulation order M equal or superior to 2;

the detected signals have a symbol Error Rate (SER) intermediate in terms of performance between a coherent detection and a non-coherent detection assuming a same spectral efficiency;

the demodulator is less complex than a coherent demodulator, and wherein the SER performance of the detected signals using the demodulator is substantially similar to a SER performance obtained using a coherent demodulator;

the channel is a multi-path fading channel; and the received signals have an energy $\eta$ and the channel attenuation coefficients have a magnitude $|h|^2$, and wherein the demodulator is configured to equalize the energy of the received signals $\eta$ using only the magnitude of the channel coefficients $|h|^2$ such that an equalized envelop of the received signals is obtained according to the following equation in which the multipath fading effect of the channel on the transmitted signals is converted into an additive disturbance:

$$\zeta = \frac{\eta}{|h|^2} = \frac{|v|^2}{|h|^2} = |A_i^2| + \frac{1}{|h|^2}[(h^*A_i^*w + hA_iw^*) + |w|^2]$$

where $\zeta$ is: the energy equalized signal
where $v$ is: the received signal
where $A_i^2$ is: the energy of the transmitted symbol
where $w$ is: additive white Gaussian noise
where $(.)^*$ denotes the complex conjugate.

2. The digital communication receiver as claimed in claim 1, wherein the demodulator makes decisions for the detection of transmitted signals according to the following conditional probability distribution function (PDF):

$$P(\zeta|E_i) = \frac{(\Psi_i + \sigma_w^4)\sigma_h^2}{[(\zeta - E_i)^2\sigma_h^4 + 2\Psi_i + \sigma_w^4]^{3/2}}$$

where $\zeta$ is a decision variable and where $\psi_i = (\zeta + E_i)\sigma_w^2\sigma_h^2$
where $E_i$ is: the energy of the transmitted symbol
where $\sigma_w^2$ is: the noise variance
where $\sigma_h^2$ is: the variance of the fading coefficients.

3. The digital communication receiver as claimed in claim 2, where the demodulator makes decisions for the detection of transmitted signals according to the following minimum distance detector (MDD) equation:

$$\hat{A}_i = \mathrm{argmin}_{E_i}[\zeta - E_i]^2, \; i = [0, 1, \ldots, M-1],$$

where $\hat{A}_i$ is: the estimated symbol amplitude
where M is the modulation order.

4. The digital communication receiver as claimed in claim 3, wherein the MDD has a Signal to Error Ratio (SER) which follows the following equation:

$$P_S = 1 - \frac{1}{M} + \frac{1}{M}\left[\sum_{i=1}^{M-1}\lambda_i - \sum_{i=2}^{M}\chi_i\right],$$

where $$\lambda_i \triangleq \frac{1 - \delta^2[i - 0.5]\Gamma}{2\sqrt{(\delta^2[i-0.5]\Gamma)^2 + 2\delta^2[2i^2 - 3i + 1.5]\Gamma + 1}}$$

where $$\chi_i \triangleq \frac{1 + \delta^2[i - 0.5]\Gamma}{2\sqrt{(\delta^2[i-1.5]\Gamma)^2 + 2\delta^2[2i^2 - 5i + 3.5]\Gamma + 1}}$$

where $$\Gamma = \frac{\sigma_H^2}{\sigma_w^2}\bar{E},$$

and $\bar{E} = 1/M\Sigma_{i=0}^{M-1}E_i$ is the average power per symbol which is normalized to unity,
where $P_S$ is: the symbol error probability
where $\chi_i$ is: already defined above
where $\delta$ is: amplitde difference between adjacent symbols
where $\Gamma$ is: average symbol energy.

5. The digital communication receiver as claimed in claim 1, wherein the attenuation channel coefficients are obtained by inserting pilot symbols within the transmitted signals with a particular time spacing, the pilot symbols having a constant modulus, $|s|^2 = P$, where P is a constant.

6. The digital communication receiver as claimed in claim 5, where an estimated value of the channel attenuation magnitude $|h|^2$ is obtained by computing $\hat{\alpha} = \eta_P/|s|^2$, Where $$\eta_P = |v_P|^2 = |h|^2|s|^2 + (h^*s^*w = hsw^*) + |w|^2.$$

7. A computer-implemented demodulation method comprising:

receiving from a digital communication receiver signals transmitted by a digital transmitter through a communication channel, the channel having a channel attenuation |h| and a channel phase shift having a multipath fading effect on the transmitted signals; and demodulating the signals received by the receiver using only channel coefficients representing the channel attenuation without any knowledge of the channel phase shift for detecting the transmitted signals, wherein:

the demodulation method is robust to phase noise, large phase variations and time-varyinq I-Q imbalance;

the demodulation method uses a M-ary amplitude shift keying technique, the transmitted signals being modulated by the transmitter using said same technique before transmission using a modulation order M equal or superior to 2;

the detected signals have a symbol Error Rate (BER) intermediate in terms of performance between a coherent detection and a differentially coherent detection assuming a same spectral efficiency;

the demodulation method is less complex than a coherent demodulation, and wherein the SER performance of the detected signals using the demodulation method is substantially similar to a SER performance obtained using a coherent demodulation;

the channel is a multi-path fading channel;

the received signals have an energy η and the channel attenuation coefficients have a magnitude $|h|^2$, and wherein the demodulation method further comprises equalizing the energy of the received signals η using only the manquitude of the channel coefficients $|h|^2$ such that an equalized envelop of the received signals is obtained according to the following equation in which the multipath fading effect of the channel on the transmitted signals is converted into an additive disturbance:

$$\zeta = \frac{\eta}{|h|^2} = \frac{|v|^2}{|h|^2} = |A_i|^2 + \frac{1}{|h|^2}[(h^*A_i^*w + hA_iw^*) + |w|^2].$$

where ζ is: the energy equalized signal
where v is: the received signal
where $A_i^2$ is: the energy of the transmitted symbol
where w is: additive white Gaussian noise
where (.)* denotes the complex conjugate.

8. The demodulation method as claimed in claim 7, further comprising making decisions for the detection of transmitted signals according to the following conditional probability distribution function (PDF):

$$P(\zeta | E_i) = \frac{(\Psi_i + \sigma_w^4)\sigma_h^2}{[(\zeta - E_i)^2\sigma_h^4 + 2\Psi_i + \sigma_w^4]^{3/2}}$$

where ζ is a decision variable and where $\psi_i=(\zeta+E_i)\sigma_w^2\sigma_h^2$
where $E_i$ is: the energy of the transmitted symbol
where $\sigma_w^2$ is: the noise variance
where $\sigma_h^2$ is: the variance of the fading coefficients.

9. The demodulation method as claimed in claim 8, further comprising making decisions for the detection of transmitted signals according to the following minimum distance detector (MDD) equation:

$\hat{A}_i = argmin_{E_i}[\zeta - E_i]^2, i=[0,1,\ldots,M-1]$, where $\hat{A}_i$ is: the estimated symbol amplitude
where M is the modulation order.

10. The demodulation method as claimed in claim 9, wherein the MDD has a Signal to Error Ratio (SER) which follows the following equation:

$$P_S = 1 - \frac{1}{M} + \frac{1}{M}\left[\sum_{i=1}^{M-1}\lambda_i - \sum_{i=2}^{M}\chi_i\right],$$

where $$\lambda_i \triangleq \frac{1 - \delta^2[i-0.5]\Gamma}{2\sqrt{(\delta^2[i-0.5]\Gamma)^2 + 2\delta^2[2i^2 - 3i + 1.5]\Gamma + 1}}$$

$$\chi_i \triangleq \frac{1 + \delta^2[i-0.5]\Gamma}{2\sqrt{(\delta^2[i-1.5]\Gamma)^2 + 2\delta^2[2i^2 - 5i + 3.5]\Gamma + 1}}$$

where $$\Gamma = \frac{\sigma_H^2}{\sigma_w^2}\bar{E},$$

and $\bar{E}=1/M\Sigma_{i=0}^{M-1}E_i$ is the average power per symbol which is normalized to unity where $P_S$ is: the symbol error probability
where $\chi_i$ is: already defined above
where δ is: amplitde difference between adjacent symbols
where Γ is: average symbol energy.

11. The demodulation method as claimed in claim 7, wherein the attenuation channel coefficients are obtained by inserting pilot symbols within the transmitted signals with a particular time spacing, the pilot symbols having a constant modulus , $|s|^2=P$, where P is a constant.

12. The demodulation method as claimed in claim 11, where an estimated value of the channel attenuation magnitude $|h|^2$ is obtained by computing $\alpha=\eta_P/|s|^2$, Where $\eta_P=|v_P|^2=|h|^2|s|^2+(h^*s^*w=hsw^*)+|w|^2$.

13. A demodulator device for detecting signals transmitted by a digital transmitter to a digital receiver through a communication channel, the channel having a channel attenuation |h| and a channel phase shift having a multipath fading effect on the transmitted signals, the demodulator device being configured to communicate with the digital receiver for demodulating signals received by the receiver using channel coefficients representing the channel attenuation only without any knowledge of the channel phase shift, wherein:

the demodulation is robust to phase noise, large phase variations and time- varying I-Q imbalance;

the demodulator device uses a M-ary amplitude shift keying technique, the transmitted sicinals being modulated by the transmitter using said same technique before transmission using a modulation order M superior to 2;

the detected sicinals have a Bit Error Rate (BER) intermediate in terms of performance between a coherent detection and a differentially coherent detection assuming a same spectral efficiency;

the demodulator device is less complex than a coherent demodulator, and wherein the BER performance of the detected signals using the demodulator is substantially similar to a BER performance obtained using a coherent demodulator;

wherein the channel is a multi-path fading channel;

wherein the received signals have an energy n and the channel attenuation coefficients have a magnitude $|h|^2$, and wherein the demodulator is configured to equalize the energy of the receivd sqinals n using only the magnitude of the channel coefficients $|h|^2$ such that an equalized envelop of the received signals is obtained according to the following equation in which the multipath fading effect of the channel on the transmitted signals is converted into an additive disturbance:

$$\zeta = \frac{\eta}{|h|^2} = \frac{|v|^2}{|h|^2} = |A_i^2| + \frac{1}{|h|^2}[(h^*A_i^*w + hA_iw^*) + |w|^2]$$

where $\zeta$ is: the energy equalized signal
where $v$ is: the received signal
where $A_i^2$ is: the energy of the transmitted symbol
where $w$ is: additive white Gaussian noise
where $(.)^*$ denotes the complex conjugate.

14. The demodulator device as claimed in claim 13, wherein the demodulator device makes decisions for the detection of transmitted signals according to the following conditional probability distribution function (PDF):

$$P(\zeta|E_i) = \frac{(\Psi_i + \sigma_w^4)\sigma_h^2}{[(\zeta - E_i)^2\sigma_h^4 + 2\Psi_i + \sigma_w^4]^{3/2}}$$

where $\zeta$ is a decision variable and where $\psi_i = (\zeta + E_i)\sigma_w^2\sigma_h^2$
where $E_i$ is: the energy of the transmitted symbol
where $\sigma_w^2$ is: the noise variance
where $\sigma_h^2$ is: the variance of the fading coefficients.

15. The demodulator device as claimed in claim 14, where the demodulator device makes decisions for the detection of transmitted signals according to the following minimum distance detector (MDD) equation:

$$\hat{A}_i = \mathrm{argmin}_{E_i}[\zeta - E_i]^2, \; i=[0,1,\ldots,M-1],$$

where $\hat{A}_i$ is: the estimated symbol amplitude
where $M$ is the modulation order.

16. The demodulator device as claimed in claim 15, wherein the MDD has a Signal to Error Ratio (SER) which follows the following equation:

$$P_S = 1 - \frac{1}{M} + \frac{1}{M}\left[\sum_{i=1}^{M-1}\lambda_i - \sum_{i=2}^{M}\chi_i\right],$$

where $$\lambda_i \triangleq \frac{1 - \delta^2[i-0.5]\Gamma}{2\sqrt{(\delta^2[i-0.5]\Gamma)^2 + 2\delta^2[2i^2 - 3i + 1.5]\Gamma + 1}}$$

$$\chi_i \triangleq \frac{1 + \delta^2[i-0.5]\Gamma}{2\sqrt{(\delta^2[i-1.5]\Gamma)^2 + 2\delta^2[2i^2 - 5i + 3.5]\Gamma + 1}}$$

where $$\Gamma = \frac{\sigma_H^2}{\sigma_w^2}\overline{E},$$

and $\overline{E} = 1/M\Sigma_{i=0}^{M-1}E_i$ is the average power per symbol which is normalized to unity
where $P_S$ is: the symbol error probability
where $\chi_i$ is: already defined above
where $\delta$ is: amplitde difference between adjacent symbols
where $\Gamma$ is: average symbol energy.

17. The demodulator device as claimed in claim 13, wherein the attenuation channel coefficients are obtained by inserting pilot symbols within the transmitted signals with a particular time spacing, the pilot symbols having a constant modulus, $|s|^2 = P$, where P is a constant.

18. The demodulator device as claimed in claim 17, where an estimated value of the channel attenuation magnitude $|h|^2$ is obtained by computing $\alpha = \eta_P/|s|^2$,
Where $$\eta_P = |v_P|^2 = |h|^2|s|^2 + (h^*s^*w = hsw^*) + |w|^2.$$

* * * * *